United States Patent
Braunschweig et al.

(10) Patent No.: US 9,631,851 B2
(45) Date of Patent: Apr. 25, 2017

(54) VACUUM CONTAINER FOR REMOVING FOREIGN GASES FROM AN ADSORPTION REFRIGERATION MACHINE

(75) Inventors: Niels Braunschweig, Berlin (DE); Soeren Paulussen, Berlin (DE); Eythymios Kontogeorgopoulos, Berlin (DE)

(73) Assignee: INVENSOR GMBH, Berlin (DE)

( * ) Notice: Subject to any disclaimer, the term of this patent is extended or adjusted under 35 U.S.C. 154(b) by 198 days.

(21) Appl. No.: 13/988,789

(22) PCT Filed: Nov. 23, 2011

(86) PCT No.: PCT/DE2011/075285
§ 371 (c)(1),
(2), (4) Date: May 22, 2013

(87) PCT Pub. No.: WO2012/069048
PCT Pub. Date: May 31, 2012

(65) Prior Publication Data
US 2013/0239595 A1  Sep. 19, 2013

(30) Foreign Application Priority Data

Nov. 23, 2010  (DE) ........................ 10 2010 052 424

(51) Int. Cl.
| | | |
|---|---|---|
| F25B 19/00 | (2006.01) | |
| F25B 43/00 | (2006.01) | |
| F25B 17/08 | (2006.01) | |
| F25B 43/04 | (2006.01) | |

(52) U.S. Cl.
CPC ............ *F25B 43/00* (2013.01); *F25B 17/083* (2013.01); *F25B 43/046* (2013.01); *Y02B 30/62* (2013.01); *Y02B 30/64* (2013.01)

(58) Field of Classification Search
CPC ........ F25B 43/04; F25B 43/00; F25B 43/046; Y02B 30/64; Y02B 30/62
See application file for complete search history.

(56) References Cited

U.S. PATENT DOCUMENTS

| | | | | |
|---|---|---|---|---|
| 2,767,559 | A * | 10/1956 | Knowles | ........................ 62/475 |
| 4,752,310 | A | 6/1988 | Maier-Laxhuber et al. | |
| 5,636,526 | A | 6/1997 | Plzak et al. | |
| 6,490,875 | B2 * | 12/2002 | Chua | .................... F25B 17/083 |
| | | | | 62/144 |
| 6,564,564 | B2 * | 5/2003 | Heiden | ................. F25B 43/043 |
| | | | | 62/195 |

(Continued)

FOREIGN PATENT DOCUMENTS

| | | |
|---|---|---|
| DE | 34 08 193 A1 | 9/1985 |
| DE | 34 25 419 A1 | 1/1986 |

(Continued)

*Primary Examiner* — Elizabeth Martin
(74) *Attorney, Agent, or Firm* — Joyce von Natzmer; Agris & von Natzmer LLP (57) ABSTRACT

Disclosed is a vacuum container for an adsorption refrigeration machine, the vacuum container being connected to a condenser unit of the adsorption refrigeration machine via a connection that permits the passage of vapor. The container has a discharge arrangement and at least one cooling element. The connection means are provided with at least one component for shutting off or regulating the flow of fluids.

19 Claims, 6 Drawing Sheets

(56) References Cited

U.S. PATENT DOCUMENTS

2005/0235828 A1* 10/2005 Ishihara ................. B01D 53/02
                                                          95/131
2009/0217680 A1*  9/2009 Petersen ............... F25B 43/046
                                                           62/85
2010/0293989 A1* 11/2010 Buttner et al. .................. 62/478

FOREIGN PATENT DOCUMENTS

| | | |
|---|---|---|
| DE | 103 10 748 B3 | 8/2004 |
| DE | 44 44 252 B4 | 5/2007 |
| EP | 2 357 433 A1 | 8/2011 |
| JP | 2000 292033 | 10/2000 |
| JP | 2000292033 A * 10/2000 | ............. F25B 43/04 |
| JP | 2002 048436 | 2/2002 |

* cited by examiner

VACUUM CONTAINER FOR REMOVING FOREIGN GASES FROM AN ADSORPTION REFRIGERATION MACHINE

This is the U.S. national stage of International application PCT/DE2011/075285, filed Nov. 23, 2011 designating the United States and claiming priority to German application DE 102010052424.7, filed Nov. 23, 2010.

The present invention relates to a vacuum container for removing foreign gases from an adsorption refrigeration machine such that the vacuum container is connected to a condenser unit of the adsorption refrigeration machine via connecting means that are open to permit vapor to pass through, and the container has a discharge system and at least one cooling element. At least one component in the connecting means is provided for shutting off or regulating the flow of fluids. In addition, the invention also relates to an adsorption refrigeration unit and a method for removing foreign gas from an adsorption refrigeration unit.

Refrigeration machines, which are generally used for heating and/or cooling buildings, are known in the state of the art. Refrigeration machines implement thermodynamic circulation processes in which heat is taken up at a temperature below ambient temperature, for example, and is released at a higher temperature. The thermodynamic circulation processes resemble those of a heat pump. Refrigeration machines known in the state of the art include, for example, adsorption refrigeration systems, (diffusion) adsorption refrigeration machines and compression refrigeration systems.

An adsorption refrigeration machine comprises at least one adsorber/desorber unit, an evaporator, a condenser and/or a combined evaporator/condenser unit, which are accommodated in a shared container or in separate containers, which are then connected to one another by pipes for the flow of refrigerant. The advantage of sorption machines in comparison with conventional heat pump technology is that the adsorption/desorption sequence is accomplished simply by thermal regulation of the sorbent. Thus the container of an adsorption refrigeration machine can be sealed airtight and hermetically. For example, when water is used as the refrigerant, the adsorption refrigeration machine will preferably operate in the reduced pressure range.

The adsorption taking place in an adsorption refrigeration machine is a physical process, in which a gaseous refrigerant (for example, water vapor) is added onto a solid. Desorption of the refrigerant, i.e., releasing the refrigerant from the solid, requires energy. In an adsorption refrigeration machine, the refrigerant (which takes up heat at a low temperature and low pressure and releases heat at a higher temperature and higher pressure) is selected so that a change in aggregate state is associated with either adsorption or desorption. In the state of the art, substances having a fine porosity and consequently having an extremely large internal surface area have been described as adsorbents. Advantageous materials include activated carbon, zeolites, aluminum oxide or silica gel, aluminum phosphates, silica aluminum phosphates, metal silica aluminum phosphates, mesostructure silicates, organometal structures and/or microporous materials comprised of microporous polymers. The adsorbent material may advantageously be applied in different ways, i.e., it may be a loose bed, an adhesive bond and/or crystallized solids. The adsorption refrigeration system may be adapted to different requirements thanks to these different types of application. The machine can thus be adapted to the location or to the refrigerant. Furthermore, the layer thickness of the adsorbent material is also crucial for the performance of the adsorption refrigeration machine.

In the process of the adsorption refrigeration machine, the heat of adsorption and the heat of condensation must be removed from the system. This is usually accomplished via a flowing heat exchanger, which transports this heat to a heat sink, e.g., to a heat exchanger system (heat exchanger circulation) which transports this heat to the ambient air. However, if the heat of adsorption and/or the heat of condensation were not dissipated at all or were dissipated badly, the temperatures and thus the pressures inside the adsorption refrigeration machine would rise and the adsorption process would come to a standstill. The efficiency of an adsorption refrigeration machine can thus be increased substantially by an improved heat transfer, which necessarily also improves the efficiency of the system. Similarly, the cold is passed over a flowing heat exchanger to a heat source via a refrigeration cycle.

A vacuum container is usually necessary for the evaporation in sorption machines because water, for example, may be used as a refrigerant and therefore low pressures are necessary accordingly.

An adsorption refrigeration machine may also have a recirculation system, serves to ensure the removal of a fluid, in particular a refrigerant, between different components of the adsorption refrigeration system while maintaining a pressure difference that fluctuates in accordance with the operating conditions. This ensures a continuous flow of the fluid. The recirculation system is important in particular for recirculating the liquefied refrigerant from the condenser into the evaporator because only in this way can a refrigerant circulation be maintained in the system.

A method for operating an adsorption refrigeration machine is known from DE 34 08 193 A1. This method serves to raise the temperature of heat at which a first and second expeller (adsorber) are switched periodically between adsorption phase and desorption phase and are operated in opposite phases. Before exchanging the mechanisms of action of the two adsorbers, a two-stage internal heat exchange is implemented. This internal heat exchange includes first a pressure equalizing step, followed by heat transfer through a heat transfer coil. The process is continued after achieving an equalization of heat between the two absorbers [sic; adsorbers]. In other words, after switching between the adsorption phase and the desorption phase, a temperature equalization between the adsorbers is performed to utilize the remaining heat after the desorption phase.

Heating and cooling methods which operate according to this sorption principle are known from DE 34 25 419 A1. These methods all take place in closed systems (vacuum housing), where the required vacuum pressure to make the operating fluid evaporate at an appropriately low temperatures is created when the system is manufactured. A hermetically sealed system should remain hermetically sealed even during the desorption phase following the sorption process. A cut-off device, which, when closed, prevents the sorption process, may be provided between the sorbent container and the operating fluid container. When the cut-off device is opened, the sorption process and the associated refrigeration or heat production may begin.

In a sorption system, materials and substances may outgas or may release gases by a chemical reaction, for example. These interfering gases or vapors prevent a rapid sorption process because, during adsorption, they interfere with access of the gaseous operating fluid to the sorbent and, during desorption, they prevent or impede access of the gaseous operating fluid to the condensation surfaces, both of which greatly delay the refrigeration and/or heat production processes. This results in a substantial decline in the efficiency of these sorption systems. Interfering gases here include in general substances which influence the access of the gaseous operating fluid to the sorbent and thus interfere with the sorption process (for example, carbon dioxide, nitrogen, etc.). These gases are also referred to as inert gases or foreign gases. These substances may be presorbed in the sorbent, released by chemical reactions, outgassed from the housing materials that are used or they may enter through leakage in the system. In summary, there is in principle the problem with such vacuum sorption systems that either outgassing or leakage can lead to an increase in pressure and thus to impaired functioning of the system.

There are descriptions of various means in the state of the art for removing the inert gases from the system of the sorption machine. For example, DE 44 44 252 B4 discloses a method in which a binder is introduced into the sorption machine. A binder is added to the sorption system to keep the system free of interfering inert gas or vapor for the sorption process, so that only the vapor of the operating fluid is present in the vapor phase. The binder has the function of binding the inert gases or vapors that are present or are released in the sorption system, thereby withdrawing them from the vapor space of the operating fluid. It must be capable of binding as much inert gas or vapor as the amount released in the sorption system by degassing or chemical reaction of the substances contained therein. Therefore, in a hermetically sealed sorption system, only a limited amount of inert gas or vapor can be produced and this is usually at the start of the sorption cycles. The binder need bind only this specific amount of inert gas within this period of time. Suitable binders include in principle any substances capable of binding inert gases or vapors generated in a sorption system. However, the binder should be capable of retaining the bound inert gas without releasing it even when there are system-related fluctuations in the temperature. Since most binders tend to have high temperatures here, the binder should be introduced at a location where the lowest possible temperatures prevail and there are only minor fluctuations in temperature. The highest temperatures in a sorption system occur in the sorbent container during sorption and desorption. According to DE 44 44 252 B4, the binder is placed in an area where lower system temperatures prevail, comparatively, for example, in the condenser, the evaporator or the collecting tank.

In addition, DE 103 10 748 B3 describes a method for removing inert gases from a sorption machine. An intermediate phase is provided here, during which a process that removes these interfering gases from the vacuum system in accordance with the detection of foreign gases in the system (for example, based on an increase in the internal pressure for inadequate condenser efficiency). First, the dissipation of heat from the condenser is suppressed as much as possible. Then heat is supplied to the sorber via a burner, for example. The operating fluid (preferably water) that is expelled as a vapor from the sorbent first condenses at the coldest location in the vacuum space and continuously heats the entire vacuum space, which is under a vacuum during normal operation as the pressure in the system rises. If the system pressure exceeds ambient pressure (ambient pressure is usually 1013 mbar, but other arrangements are also possible), opens a discharge mechanism (preferably a valve, for example) and lets the vapor contents flow out into the ambient atmosphere. To a certain extent, the vapor coming from the sorber gradually expels the foreign gases by "driving" them out. In doing so, a portion of the operating fluid is usually lost. After all the foreign gases have been removed from the system, the discharge mechanism is closed.

EP 2 357 433 discloses a device, which is connected to a sorption machine. A cavity for buffering for inert gas is connected here in the area of the liquefier. The cavity has an inlet valve in the lower area, where the inlet valve is always covered with liquid operating fluid on the end where the hollow space is located.

One disadvantage of the devices and methods of the state of the art is that they require a great equipment expense. It is associated with high costs to remove the foreign gases using a vacuum pump over a long period of time because each system would have to be equipped with a vacuum pump. With each maintenance incident, the inert gas would have to be evacuated to ensure continuous operation of the system. However, this would result in short maintenance intervals, which would in turn be associated with high costs. Removal of certain inert gases by chemical or physical binding presupposes that a foreign substance is introduced into the system. Such substances are highly selective and are not effective for all inert gases. Furthermore, it cannot be ruled out entirely that the substances introduced will have no effect on the sorption system. In addition, it is very complex and energetically unfavorable to put the entire sorption system under and excess pressure with respect to the environment by heating it to remove the inert gas. One disadvantage of the inert gas trap disclosed in EP 2 357 433 A1 is that it removes enough foreign gas from the sorption machine essentially only at higher condenser temperatures (approx. 60 to 80° C.). The "hot" vapor (high pressure) flows from the condenser into the trap and condenses on the "cold" internal surface of the trap (low pressure). However, that is possible only if the temperature of the trap is lower than the temperature of the condenser. At lower condenser temperatures (e.g., 20° C. to 50° C.), the vapor in the condenser may already be colder than the vapor in the trap, so that it is impossible for vapor to flow from the condenser into the trap, and the trap becomes nonfunctional accordingly. The trap that has been disclosed can be used only in a very limited temperature range because of its shortcomings.

Thus the object of the invention was to provide means which would not have the disadvantages and shortcomings of the state of the art and would permit continuous operation of an adsorption refrigeration machine.

This object is achieved by the independent claims. Advantageous embodiments are derived from the dependent claims.

It was completely surprising that a vacuum container for an adsorption refrigeration machine that does not have the disadvantages and shortcomings of the state of the art could be made available. The vacuum container is a simple and inexpensive device with which older adsorption refrigeration machines can be retrofitted inexpensively. Furthermore, no vacuum pump, no binders or any mentionable expenditure of energy is necessary for evacuating the foreign gases. The foreign gases may be evacuated in ongoing continuous operation of the adsorption refrigeration machine but it may also be advantageous to collect the foreign gases in the container until a certain total pressure prevails in the container and only then to remove the gases from the container. Maintenance demand can be greatly reduced by the self-evacuation of the unit thereby achieved.

The vacuum container according to the invention has connecting means that are open to permit vapor to pass through and are connected to a condenser unit of the adsorption refrigeration machine. Furthermore, the container has a discharge mechanism and at least one cooling element, such that at least one component for shutting off or regulating the flow of fluids is provided in the connecting means.

The vacuum container may also be referred to as an inert gas trap in the sense of the invention. It represents in particular an external container which is connected to the adsorption refrigeration machine and in which the inert gas collects. The container may be designed for the total amount of foreign gas produced in particular, and it is also preferable to empty the container at regular or irregular intervals. The foreign gas or inert gas present in the container can be removed from the container by different methods. For example, it may be preferable to connect a vacuum pump to the discharge mechanism. The discharge mechanism may be designed, for example, as a valve, in particular an excess pressure valve or an evacuation valve or as a pressure-regulated flap valve (e.g., a non-return valve). However, it may also be preferable for a heating element to be provided on the container. A refrigerant that flows into the container together with the foreign gas to be removed can be heated by means of a heating element (e.g., by means of an electric heater) to temperatures above 100° C. If the discharge device is embodied as an excess pressure valve, then the foreign gas can be expelled without requiring any additional measures.

The component which is arranged in the connection (the connecting means) between the condenser unit and the container is preferably selected from the group comprising through-valves, corner valves, Y-type valves, solenoid valves, non-return valves or floats. The component is preferably integrated into a pipe and causes a local constriction of the flow cross section. Different valves which may be classified according to their geometric shape may advantageously be integrated into the connecting means. Through the use of the valves, the flow rates in the connecting means can be dosed accurately and precisely by varying the nominal width and the connecting means can also be reliably sealed off from the environment. The valves can be operated advantageously by hand, by the medium, by machine or electromagnetically.

It is preferable for the valve in the connecting means between the condenser unit and the container to be equipped with a control unit, which opens the valve as soon as a higher pressure prevails in the condenser unit than in the container cavity. If the component is designed as a float, then the weight of the float must be great enough to reliably close an opening on which it rests. During the desorption phase, the float is lifted by the vapor of the operating fluid filling into the container. The float may be made of a plastic, such as polypropylene.

It is preferable for a connecting means to be at least a pipe or a through-opening. The pipe is preferably connected in a form-fitting or physically bonded manner to the condenser unit and the container. Form-fitting connections are formed preferably by having at least two connecting partners that mesh with one another. The form-fitting connections include screws, rivets, pins or clamps. The pipe may be connected to components of the adsorption refrigeration machine and the container by means of screws or rivets and corresponding gaskets.

In addition, the pipe may be mounted on the condenser unit and the container by means of physical bonding agents. Physically bonded connections are held together by atomic or molecular forces. They are at the same time non-releasable connections, which can be released only by destroying them. Physically bonded connections include soldering, welding or adhesive gluing.

It may also be preferable for only one opening to be situated between the condenser unit and the container. A component for shutting off or regulating the flow of fluids is preferably integrated into the opening.

A fluid comprising a vapor and/or liquid fluid from the condenser advantageously flows from the condenser into the container through a pipe by means of the connection between the condenser unit and the container that is open to permit vapor to pass through. A fluid in the sense of the present invention denotes a gas or a liquid in particular. The refrigerant, which may also be referred to as a fluid in the sense of the present invention, is present as vapor and liquid in the condenser. It is preferable for the gaseous refrigerant and foreign gas to flow out of the condenser unit through a connecting means and into the container, such that the flow of the gases is regulated by a valve, in particular a non-return valve or a float. The component here may advantageously be operated manually or automatically or by self-regulation. However, it may also be preferable for the component to be regulated manually or automatically. For example, it may be advantageous if the component always opens at certain operating points of the adsorption refrigeration machine.

Those skilled in the art will know that operating points may denote certain points in the characteristics map or on the characteristic line of a technical apparatus, preferably a sorption machine, especially preferably an adsorption refrigeration machine or an adsorption heat machine, which may be assumed on the basis of the system properties and the prevailing external influences and parameters. Examples of this include the temperatures of the heat sinks and sources or total volume flows in the recooling circuit in the evaporator or the desorber line.

It was completely surprising that the vacuum container could be used universally and could be adapted to different installation configurations. The container may advantageously be used for single-chamber systems, for example, using two adsorbers or for dual-chamber or multi-chamber systems, each having only one adsorber of an adsorption refrigeration machine. Furthermore, it can be adapted easily and quickly to other types of sorption machines. The equipment of the machines need not be altered significantly for this purpose. The plant configuration in the sense of the present invention preferably denotes the configuration of the machine, i.e., for example, the internal hydraulic connections of the components of the machine, the internal connections of the components on the refrigerant side or the modified basic design of the machine (e.g., the number of adsorbers, operation of the evaporator, operation of the condenser, etc.).

A pipe in the sense of the present invention describes in particular an elongated hollow body whose length is usually much greater than its cross section. It may also have a rectangular or oval cross section or even some other cross section. The pipe preferably has a length of 0 to 2 m, but a length of 0 m to 1 m is especially advantageous. The pipe may simply be connected to the condenser unit and the container. In the sense of the present invention, it may also be advantageous to design the pipe to be short, so that it is present only as an opening between the condenser unit and the container. This may be necessary in particular with very compact systems. Nevertheless this has been described in the state of the art. Accordingly, connecting means in the sense of the present invention will include in particular at least one pipe, one opening or a passage through which a mass flow of liquid and/or gaseous refrigerant and/or foreign gas can flow.

The pipe is preferably made of metal, plastic and/or ceramic materials. Preferred variants include steel, stainless steel, cast iron, copper, brass, nickel alloys, titanium alloys, aluminum alloys, plastic, combinations of plastic and metal (composite pipe), combinations of glass and metal (enamel) or ceramic. It may also be preferable to join multiple pipes together in a force-locking and/or physically bonded manner. Force-locking compounds comprise tension rings, molded parts, curved pipe segments, screws or rivets. Physically bonded compounds comprise gluing, welding, soldering or vulcanization. Because of the good thermal conductivity, copper or aluminum is advantageously used as the material for the pipes but it may also be advantageous to use stainless steel because it has high static and dynamic strength values and has a high corrosion resistance. Pipes made of plastic, for example, polyvinyl chloride are especially lightweight and flexible and can thus reduce the weight of the adsorption refrigeration machine. Ceramic materials including structural ceramic materials have a high stability and a long shelf life. Combinations of the materials listed here are especially advantageous because different substance properties can be combined in this way. The preferred materials meet the high technical manufacturing demands of a pipe and/or an adsorption refrigeration machine because they are stable with respect to high temperatures or varying pressures.

The vacuum container is also preferably made of metal. It has been found that it is possible in this way to make available an inexpensive means for removal of foreign gas from an adsorption refrigeration machine, which can also withstand high and variable pressures.

It was completely surprising that the vacuum container could be used to remove a foreign gas from an adsorption refrigeration machine where the vacuum container is connected to an evaporator/condenser unit of the adsorption refrigeration machine, and the container has connecting means having a valve, a discharge mechanism and at least one cooling element. In particular through the cooling of the vacuum container, it is possible to make available an inert gas trap which efficiently "sucks" the foreign gas out of the condenser unit. It has been found that evacuation of the foreign gas out of the condenser is made possible only through cooling of the vacuum container. Through the cooling of the container, a universally usable means is made available whose functionality is not limited by a high ambient temperature. Furthermore, it has been found that by non-cooling of the container it is possible to ensure that inert gas will flow out of the condenser and into the container because the container itself has assumed a temperature above the condenser temperature due to prior heating, for example, or due to an elevated temperature below a design housing of an adsorption refrigeration machine. Thus the pressure in the container would optionally be higher than that in the condenser unit and no inert gas would flow out of the condenser and into the container.

The vacuum container has a cooling element which preferably keeps the temperature of the container at a temperature lower than the same as or similar to that of the condenser unit. Those skilled in the art will know that the temperature of the units of the adsorption refrigeration machine correlates with the pressure prevailing in the units in an adsorption refrigeration machine. If the concentration of inert gas in the container or the adsorption refrigeration machine rises, then it may optionally be possible to establish a correlation between the temperature and pressure. Furthermore, those skilled in the art will know that a drop in pressure follows a drop in temperature. It is preferable for a pressure lower than the pressure in the condenser in particular to prevail in the vacuum container such that the temperature is the same as or similar to the temperature in the condenser because of the inert gas in the container. It would be simple for those skilled in the art to determine a "similar" temperature. A "similar" temperature in the sense of the invention occurs in particular when the temperature difference between the condenser and the container is less than 40° C., preferably less than 20° C. and especially preferably less than 5° C.

It is preferably for a low [sic; lower] pressure to prevail in the container than in the condenser. This makes it possible to ensure that inert gas flows out of the condenser and into the container. The reduction in pressure is preferably achieved by cooling the vacuum container and it may also be preferable to increase the pressure, in particular the temperature in the condenser. This may advantageously be accomplished by the fact that less heat is dissipated out of the condenser. In addition, it may be preferable for the connecting means between the container and condenser to be opened when the pressure in the condenser is high, in particular higher than that in the vacuum container. Those skilled in the art will know that an adsorption refrigeration machine will have different modes of operation and that different pressures will prevail at different points in time in the machine. It is thus advantageous if the inert gas is removed from the condenser unit when the pressure difference between the container and the condenser is high or even highest. The highest pressure difference in the sense of the present invention may also be referred to as a pressure peak. Pressure peaks refer to high pressures with which those skilled in the art are familiar in an adsorption refrigeration machine, which recur periodically, preferably in one unit of the adsorption refrigeration machine and correlate with the individual phases of the adsorption refrigeration machine (e.g., adsorption, desorption, condensation or evaporation).

Those skilled in the art are aware of means for cooling. The cooling elements or means for cooling preferably include the following:

Cooling with the condensate (i.e., the liquid refrigerant) from the condenser, in particular with another connecting means between the condenser and container through which liquid refrigerant flows out of the condenser and into the container, preferably Externally (with a heat exchange element, e.g., a pipe coil) so that the refrigerant is sent of the condenser and into the heat exchange element (in particular into a heat exchanger) and/or, Internally (supply of liquid refrigerant through connecting means from the condenser into the container), Cooling by means of a fan, Connection by means of connecting means between the container and the evaporator (the evaporator is by far the coldest area in an adsorption refrigeration machine), A Peltier element, which is arranged on or near the container in particular, A heat transfer connection of the container to the reflux cooling circuit (the external water circuit for recooling the adsorber and the condenser), A heat transfer connection to the refrigerator cycle (evaporator cycle) of the adsorption refrigeration machine, An "active" refrigeration generating unit, in particular a liquid cooler, air conditioner or other cooling equipment with which those skilled in the art are familiar and which requires energy.

The heat transfer connection between the recooling circuit or the refrigeration circuit of the adsorption refrigeration machine may preferably be accomplished through a heat exchanger, so that a cold heat transfer medium from the recooling circuit or the refrigeration circuit is in heat transfer contact or connection with the container, in that the heat medium (or heating medium fluid) is passed through a heat exchanger, for example, which is arranged on or near the container. It may also be preferable for the container to have a connection to an area of the condenser unit where the liquid refrigerant is located. In other words, it is preferable for at least one additional connecting means to be provided between the condenser unit and the container through which liquid condensate flows. Liquid refrigerant can then flow into the container through this connect, e.g., a pipe and cool the container. Furthermore, it is preferable for the liquid refrigerant to be carried out of the condenser unit and into an external heat exchanger (e.g., a spiral pipe) and thus cool the container. In another embodiment the container has a connection to an evaporator unit of the adsorption refrigeration machine. Those skilled in the art are aware of the fact that the lowest temperatures in an adsorption refrigeration machine occur in the evaporator unit. An effective of the vacuum container is possible due to the connection which may be designed as a thermally conducting element, for example.

In another aspect, the invention relates to an adsorption refrigeration machine comprising at least one adsorber/desorber unit, an evaporator condenser unit and a vacuum container, where there are connecting means that are open to permit vapor to pass through between the condenser unit and the vacuum container and the container has at least one cooling element. The average person skilled in the art knows which of the aforementioned structural units he must use depending on the type of adsorption refrigeration machine. The list mentioned above represents a group of structural units which may be combined from the individual units—depending on the type of adsorption refrigeration machine. Those skilled in the art are familiar with the choice of individual components and how they are combined.

In a preferred embodiment of the adsorption refrigeration machine, there are at least two connecting means between the container and the condenser unit. Therefore, not only are gaseous foreign gas and refrigerant conveyed out of the condenser unit and into the container, but also it is preferable for the liquid refrigerant to flow out of the condenser unit and into the container. Thus, in a preferred embodiment, there is liquid refrigerant in the container, which can be heated by a heating element, so that foreign gas can be driven out of the container. In addition, it is preferred that there is an open connection between the condenser unit and the container, and that steam condenses in the trap when the container is cooled.

In another aspect, the invention relates to a method for removing foreign gas from an adsorption refrigeration machine, comprising at least one adsorber/desorber. It was surprising that the vacuum container could be regulated in different ways. For example, it is preferable that foreign gas out of the container with a regulated solenoid valve or a self-regulating excess pressure valve. However, the introduction of the foreign gas into the container is possible at any desired point in time or may even take place when the pressure in the condenser unit is the highest. Those skilled in the art are aware of the fact that an adsorption refrigeration machine has different modes of operation and that different pressures prevail in the units.

Unit, one evaporator/condenser unit and one vacuum container having at least one cooling element, comprising the following steps:
 a. Cooling the container by the cooling element to a temperature which is lower than, the same as or similar to that of the condenser unit,
 b. Introducing a gaseous refrigerant from the desorber unit into the condenser unit, where the refrigerant condenses at least partially in the condenser unit and the inert gas collects first in the condenser,
 c. Opening a component arranged between the condenser unit and the vacuum container for shutting off or regulating the flow of fluids, such that a foreign gas and a gaseous refrigerant flow out of the condenser unit and into the vacuum container.

It was surprising that at similar temperatures of the condenser unit and the vacuum container, the container can remove the inert gas from the condenser unit during the cyclic pressure peaks during operation of the adsorption refrigeration machine, although both of them have the same pressure in the "resting" state.

It may be advantageous if the component opens manually or automatically due to the vapor pressure in the condenser unit. It is possible in this way to regulate the phases during which the foreign gas is removed from the adsorption refrigeration machine. The container is preferably heated by a heating agent (e.g., an electric heater or a Peltier element) so that a discharge device is opened manually or automatically due to the total pressure inside the container, and the inert gas flows out of the container.

It is preferable for the opening of the component to take place during pressure peaks in the condenser unit during normal operation of the adsorption refrigeration machine. Those skilled in the art will know that in operation of the adsorption refrigeration machine, in particular in different phases, different pressures can prevail in the units of the machine. Accordingly, it may be advantageous if the component is opened at a pressure peak at which the pressure in the condenser unit is high or if it opens automatically or in a self-regulating manner and inert gas flows out of the condenser and into the container.

In addition, it may be advantageous if the condenser is heated briefly (for example, due to reduced dissipation of heat) and thus even greater pressure peaks can be implemented, leading to an improved injection of inert gas from the condenser into the container. Due to the increase in temperature in the condenser unit, the pressure there also increases so that inert gas flows out of the condenser and into the container when opening the component.

It is preferable that the inert gas collected in the vacuum container is removed by evacuating the container. For example, a vacuum pump may be connected to the discharge device of the container for this purpose.

The invention will now be illustrated on the basis of figures as examples, although it is not limited to these examples.

FIGS. 1A-C and FIG. 2 show preferred embodiments of the vacuum container and with a condenser unit. The condenser unit 8 and the vacuum container 1 are under a vacuum. In addition to the gaseous refrigerant, the condenser unit 8 also contains an inert gas. The vacuum container 1 contains only liquid refrigerant 7 and water vapor (minimal amount or even no inert gas) in one embodiment. The connecting means to a valve 2 opens and the inert gas with the refrigerant in vapor form flows into the vacuum container 1. A pressure difference between the vacuum container and the condenser unit 8 is advantageous for this purpose. The pressure difference is preferably achieved by cooling the vacuum container with a cooling element 4.

If the foreign gas is to be removed from the vacuum container 1, then the connecting means is preferably closed by a valve 2 and the vacuum container 1 is heated with a heating element in particular. When the pressure in the vacuum container 1 is above ambient pressure, the discharge device 3 opens, so that water vapor and inert gas flow into the environment. Another possibility for cooling the vacuum container is to open the connecting means with a valve 2 and 6. Liquid refrigerant flows through the connecting means via a valve 6 into the vacuum container 1, evaporating and flowing through the connecting means via a valve 2 back into the condenser unit 8. The vacuum container 1 is cooled in this way. Furthermore, it is preferable for additional cooling of the container 1 to be accomplished by introducing cold refrigerant from the condenser unit. For example, there may be a connection between a condenser unit and vacuum container 1 for this purpose.

Figure 1:
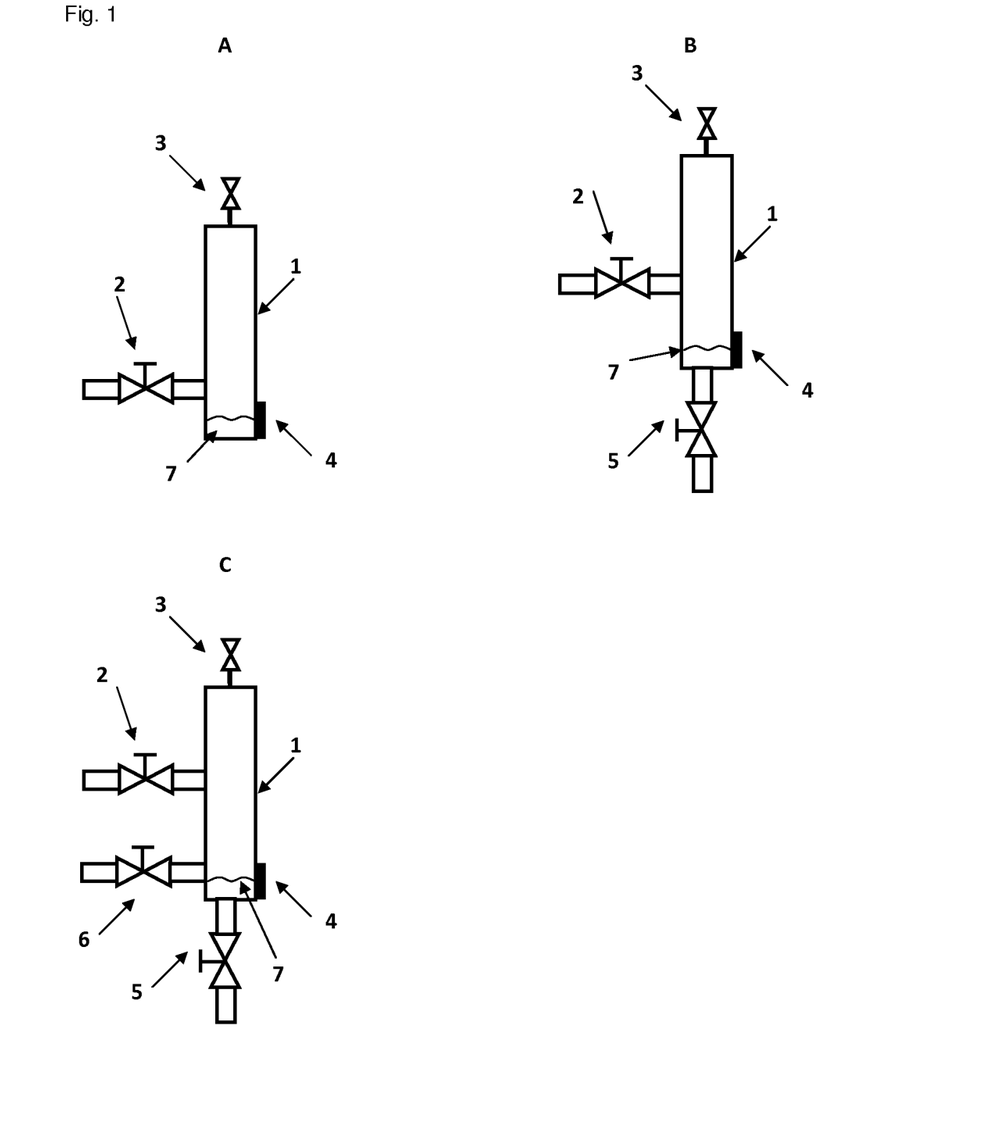
FIGS. 1A-C show preferred embodiments of the vacuum container.
Figure 2:
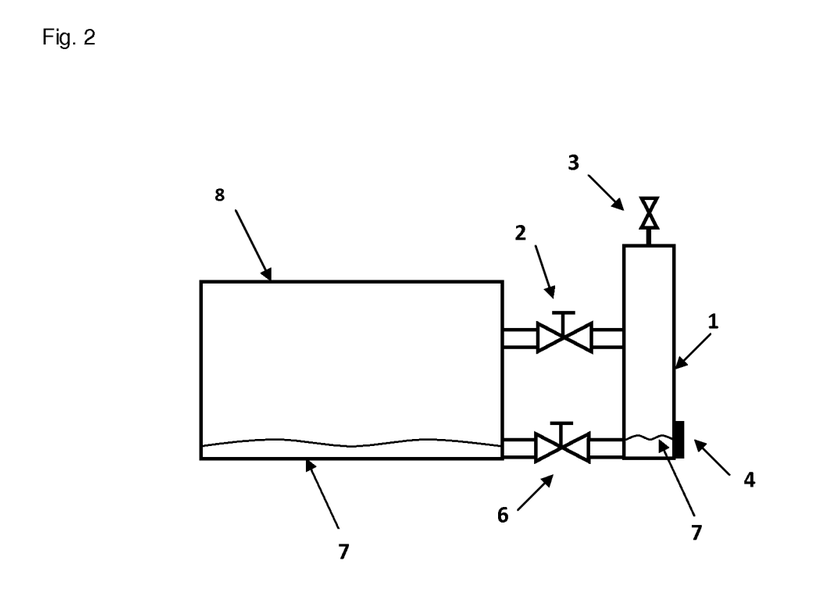
FIG. 2 shows an embodiment of a vacuum container with a condenser unit.
Figure 3:
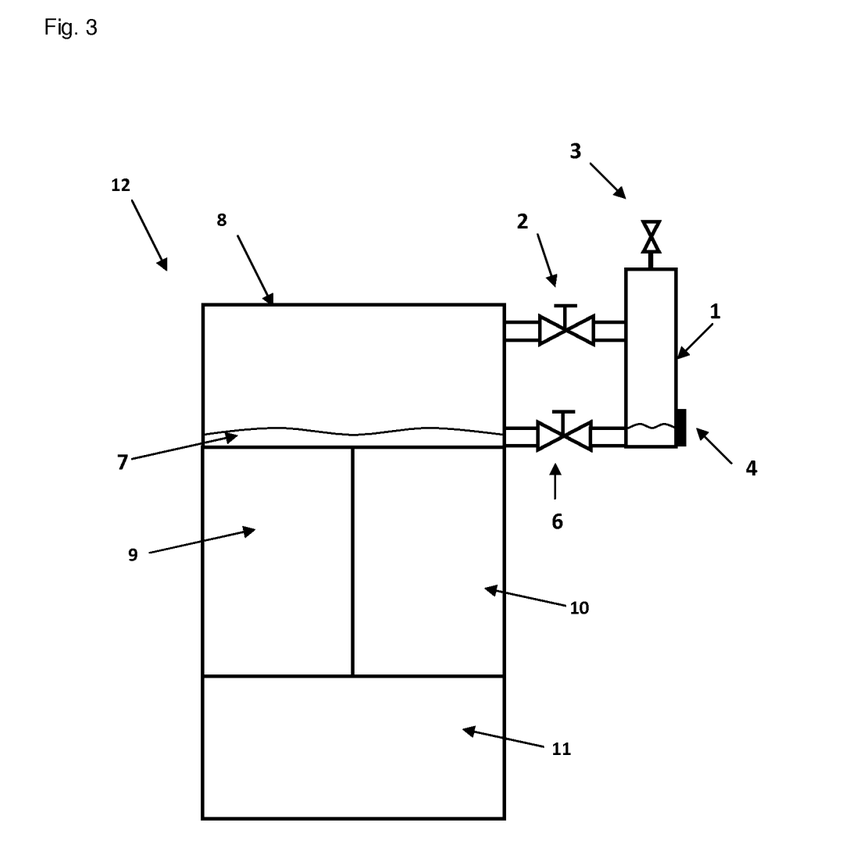
FIG. 3 shows preferred adsorption refrigeration machine with a vacuum container.
Figure 4:
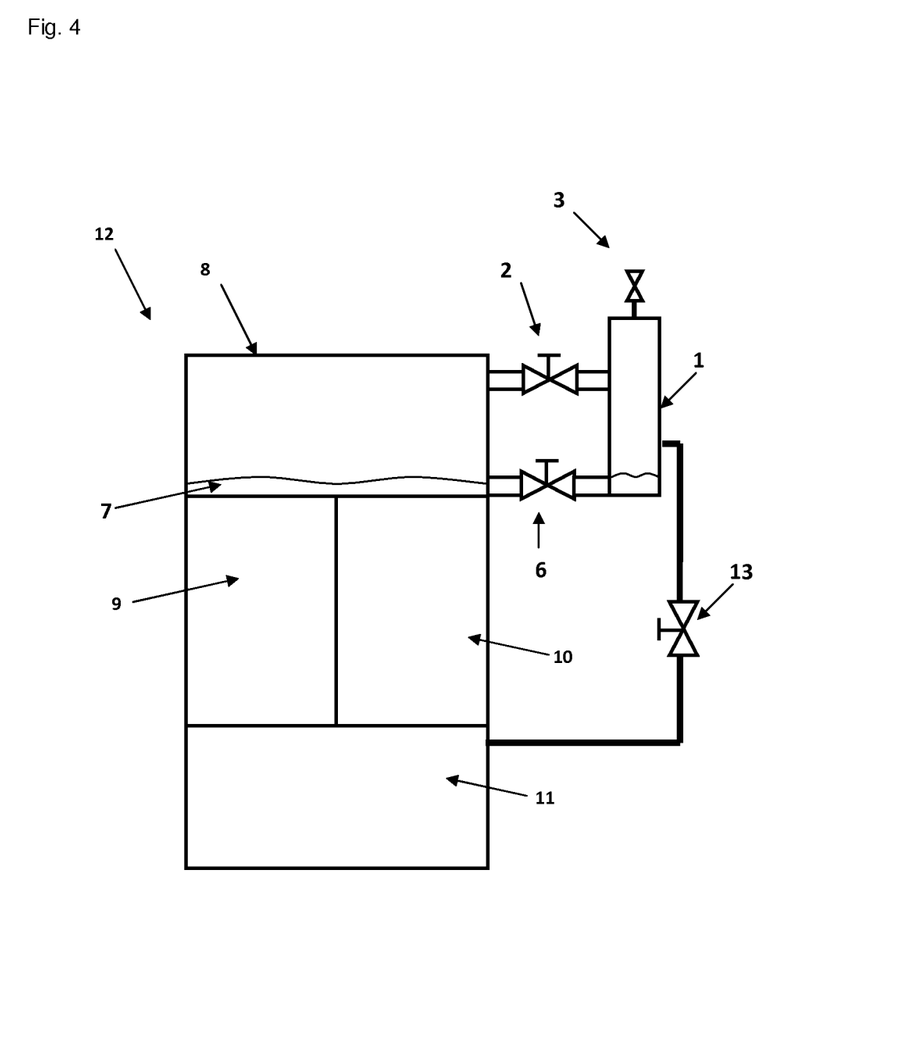
FIG. 4 shows a preferred adsorption refrigeration machine with a connection between the evaporator unit and the vacuum container.
Figure 5:
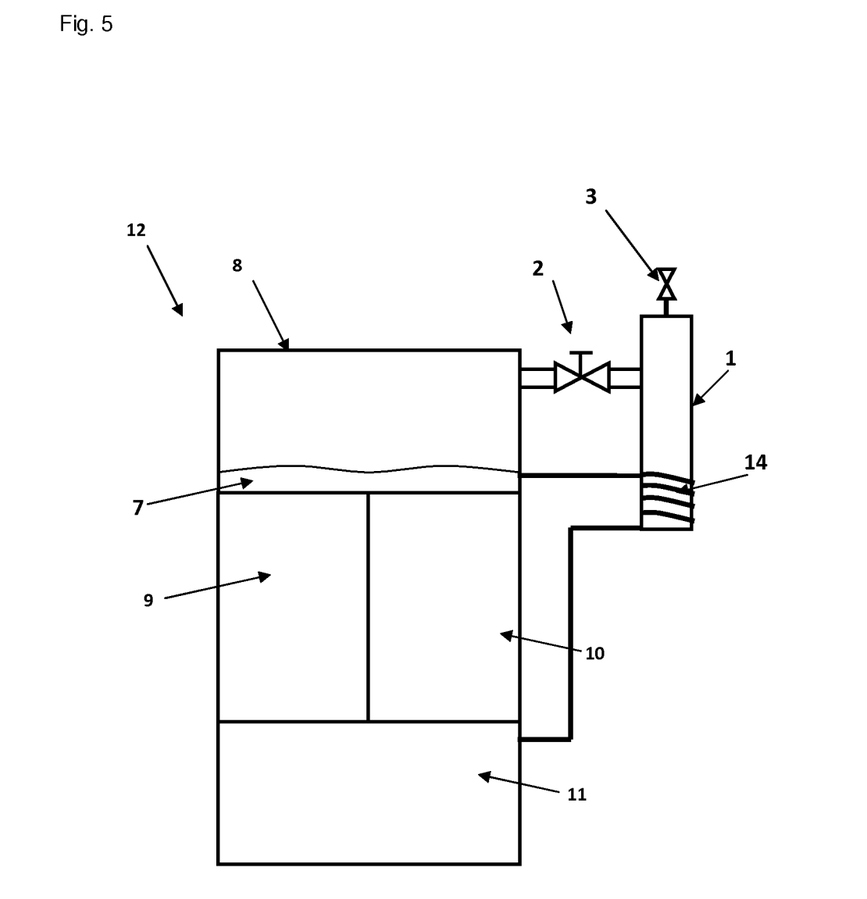
FIG. 5 shows a preferred adsorption refrigeration machine with a pipe coil around the vacuum container.

FIG. 3 shows a preferred adsorption refrigeration machine with a vacuum container and FIG. 4 shows an adsorption refrigeration machine with a connection to the evaporator unit of the adsorption refrigeration machine. FIG. 5 shows an arrangement of a pipe coil around the container. The adsorption refrigeration machine 12 preferably has a condenser unit 8, an adsorber unit 9, a desorber unit 10 and an evaporator unit 11. The vacuum container 1 withdraws foreign gas from the condenser unit 8 of the adsorption refrigeration machine 12. The foreign gas can be removed from the vacuum container 1 by a heating element in that an excess pressure is reached in the container 1 and the inert gas is released through a discharge mechanism 3. The vacuum container 1 is preferably connected to the condenser unit 8 through the connecting means 2 with a controlled valve or a non-return valve. The inert gas collects mainly in the condenser unit 8 during operation of the adsorption refrigeration machine 12.

When the valve in the connecting means 2 between the vacuum chamber 1 and the condenser unit 8 opens, the inert gas is distributed throughout the entire volume of the container 1 and the condenser unit 8, so that the inert gas concentration in the condenser unit 8 declines while it increases in the container 1 at the same time. Since the temperature in the condenser unit 8 is preferably higher than the temperature of the vacuum container 1, there is also a pressure difference between the condenser unit 8 and the vacuum container 1. This yields a vapor flow from the condenser unit 8 into the vacuum container 1. More inert gas is forced into the vacuum container 1 through this flow, so the concentration of foreign gas in the container 1 is further increased.

The intensity of the vapor flow depends on various parameters such as the pressure ratio of the condenser 8 to the container 1 and the volume ratio of the condenser 8 to the container 1. To intensify the vapor flow, the working pressure in the condenser 8 may be increased briefly. This is possible by several methods, e.g., by throttling the recooling volume flow or by active heating of the condenser 8. However, this increase in pressure always remains within the vacuum range, but it is preferable to cool the vacuum container 1 by means of a cooling element 4 and to keep the temperature of the container 1 less than, the same as or similar to the temperature in the condenser unit. Furthermore, it may be advantageous if a connecting means 13, optionally having a component (e.g., a valve) is provided between the vacuum container 1 and the evaporator unit 11. Since the pressure in evaporator unit 11 is lower than the pressure in container 1, the liquid refrigerant 7 present in container 1 evaporates when there is a connection between container 1 and evaporator 11. The gaseous refrigerant flows into the evaporator. In this evaporation process, the refrigerant takes up thermal energy from the container 1 and cools it.

The cooling of the container 1 may also be accomplished by conveying liquid refrigerant out of the condenser 8 into a heat exchange element which is present in thermally conducting contact with the container. In other words, it is preferable for a cooling element to be a heat conducting element or a heat exchange element, which may also be referred to as a heat conducting compound or heat exchanger. Examples of heat exchangers include in particular devices which have a large surface area and are mounted on the container (e.g., a pipe coil). Those skilled in the art are familiar with such heat exchangers. FIG. 5 shows one such pipe coil 14 as an example, although the invention is not limited to this. The pipe coil 14 is arranged on the container 1 and preferably has liquid refrigerant from the condenser 8 flowing through it. The liquid refrigerant may be conveyed out of the pipe coil 14 into the evaporator unit 11, so that the connection between the condenser unit 8 and the evaporator 11 can function as a condensate recirculation.

The next step is to remove the inert gas from the container 1 after a certain period of time when enough inert gas has collected in the container. This may be accomplished, for example, by heating the container or by means of a vacuum pump. An excess pressure with respect to ambient pressure is created in the container 1 by heating. Then gaseous refrigerant and inert gas can be removed to the surroundings through a discharge device 3. The connection between the container 1 and the condenser 8 is preferably blocked during this process. After this step, the container 1 is cooled (actively or passively) and the process can be repeated. The frequency of the method depends on the design of the system period.

The liquid refrigerant 7 collected in the container 1 can be removed by various means. For example, it can evaporate due to heating of the container 1 and may then condense in the condenser 8. Another possibility is for the liquid refrigerant 7 to be recycled through a connection between the sump of liquid refrigerant 7 in the container 1 and the condenser 8. It is also possible for the container 1 to be positioned next to the condenser 8, so that the amount of liquid refrigerant 7 collected in the container 1 is very small.

Figure 6:
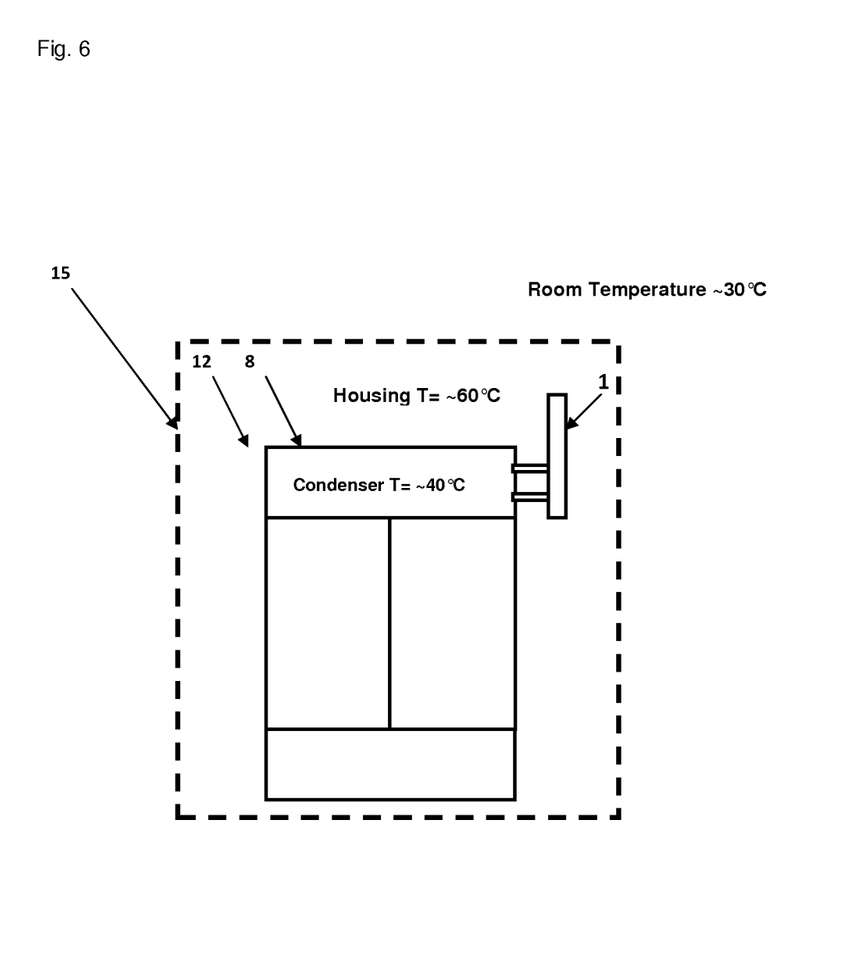
FIG. 6 shows a preferred adsorption refrigeration machine with a housing.

FIG. 6 shows an adsorption refrigeration machine like that shown previously with a housing. It has been found that temperatures of approx. 60° C. or more (see FIG. 6, housing T=) may prevail beneath a housing 15 in which an adsorption refrigeration machine 12 is located even if room temperature is only approx. 30° C. or less. These temperatures are used only for illustration and are merely given as examples. The invention is not limited to these temperatures. The container 1 assumes the temperature beneath the housing 15 because it is arranged outside of the adsorption refrigeration machine but beneath the housing 15. For the case when the condenser unit 8 has a temperature of approx. 40° C., for example (see FIG. 6, condenser T=), no inert gas can flow out of the condenser 8 and into the container 1 because the pressure in the condenser 8 is lower than that in the container 1. This case cannot be solved by the equipment or methods described in the state of the art, so no inert gas can be removed from the machine. According to the invention, however, cooling of the container 1 is provided so that the pressure in the container 1 is preferably always lower than that in the condenser 8 and evacuation of the inert gas out of the adsorption refrigeration machine and constant operation of same are ensured.

LIST OF REFERENCE NUMERALS 1 vacuum container
2 connecting means to the condenser unit
3 discharge mechanism
4 cooling element
5 connecting means to the evaporator unit
6 additional connecting means to the condenser unit
7 liquid refrigerant
8 condenser unit
9 adsorber unit
10 desorber unit
11 evaporator unit
12 adsorption refrigeration machine
13 connecting means to the evaporator unit
14 pipe coil
15 housing

The invention claimed is:
1. An adsorption refrigeration machine comprising:
at least one adsorber/desorber unit,
a single chambered vacuum container,
a heating element present on the vacuum container,
a connection that connects the vacuum container with the condenser unit of the evaporator/condenser unit, the connection being open to permit vapor to pass through, and containing within the connection at least one component for shutting off or regulating a flow of fluids from the evaporator/condenser unit to the vacuum container, the vacuum container further comprising:
a discharge mechanism which does not include a vacuum pump,
at least one cooling element.
2. The adsorption refrigeration machine according to claim 1,
wherein the cooling element is selected from the group consisting of:
a. cooling unit that uses condensate from the condenser;
b. cooling fan;
c. connection between the vacuum container and an evaporator unit of the adsorption refrigeration machine, the connection being open to permit vapor to pass through;
d. Peltier element;
e. heat exchange connection of the vacuum container with a recooling circuit of the adsorption refrigeration machine;
f heat transfer connection to a refrigerant cycle of the adsorption refrigeration machine; and
g. active refrigeration apparatus.
3. The adsorption refrigeration machine according to claim 2, wherein
condensate from the condenser is provided
i. via a heat exchange element or
ii. by introducing liquid refrigerant from the condenser unit into the vacuum container.
4. The adsorption refrigeration machine according to claim 1
wherein the component is selected from the group consisting of through-valves, corner valves, Y-type valves, solenoid valves, non-return valves and floats.
5. The adsorption refrigeration machine according to claim 1
wherein the component is manually or automatically regulated or is self-regulating.
6. The adsorption refrigeration machine according to claim 5, wherein the component is self-regulating.
7. The adsorption refrigeration machine according to claim 1
wherein the discharge mechanism is designed as a valve.
8. The adsorption refrigeration machine according to claim 7, wherein
the valve is an excess pressure valve or an evacuation valve.
9. The adsorption refrigeration machine according to claim 8, wherein the valve is a self-regulating excess pressure valve.
10. The adsorption refrigeration machine according to claim 1
wherein at least one additional connection is provided between the condenser unit and the container, so that liquid condensate flows through it.
11. The adsorption refrigeration machine according to claim 1
wherein the connection is a pipe or a through-opening.
12. The adsorption refrigeration machine according to claim 1,
wherein the discharge mechanism is directly attached to the vacuum container and is configured to open without any additional measures when the heating element has heated a gas contained in the vacuum container to a temperature of more than 100° C.
13. The adsorption refrigeration machine according to claim 12, wherein a further connection is provided between the container and an evaporator unit.
14. The adsorption refrigeration machine according to claim 1, wherein the cooling element is a heat conducting compound or heat exchanger.
15. The adsorption refrigeration machine according to claim 1, wherein the adsorption refrigeration machine does not contain a pump.
16. A method of removing a foreign gas from an adsorption refrigeration machine comprising at least one adsorber/desorber unit, one evaporator/condenser unit, one vacuum container having at least one cooling element and a heating element on the vacuum container, the method comprising:
a. cooling the vacuum container via the cooling element to a temperature, which is lower than, the same as or similar to that of the condenser unit,
b. introducing a refrigerant in the form of vapor out of the desorber unit into the condenser unit such that the refrigerant is at least partially condensed in the condenser unit and inert gas collects in the condenser,
c. opening a component situated between the condenser unit and the vacuum container for shutting off or regulating the flow of fluids such that a foreign gas and the refrigerant in vapor form flow out of the condenser unit and into the vacuum container,
d. closing the component situated between the condenser unit and the vacuum container for shutting off or regulation the flow of fluids and increasing the pressure in the vacuum container via the heating element to an excess pressure with respect to ambient pressure, and
e. removing the refrigerant in vapor form and the inert gas to the surroundings through a discharge mechanism.

17. The method according to claim 16,
wherein the opening takes place with pressure peaks in the condenser unit during normal operation of the adsorption refrigeration machine.

18. The method according to claim 16,
wherein the condenser is heated briefly.

19. The method according to claim 16,
wherein the component is opened manually or automatically or by a self-regulating method.

\* \* \* \* \*